UNITED STATES PATENT OFFICE.

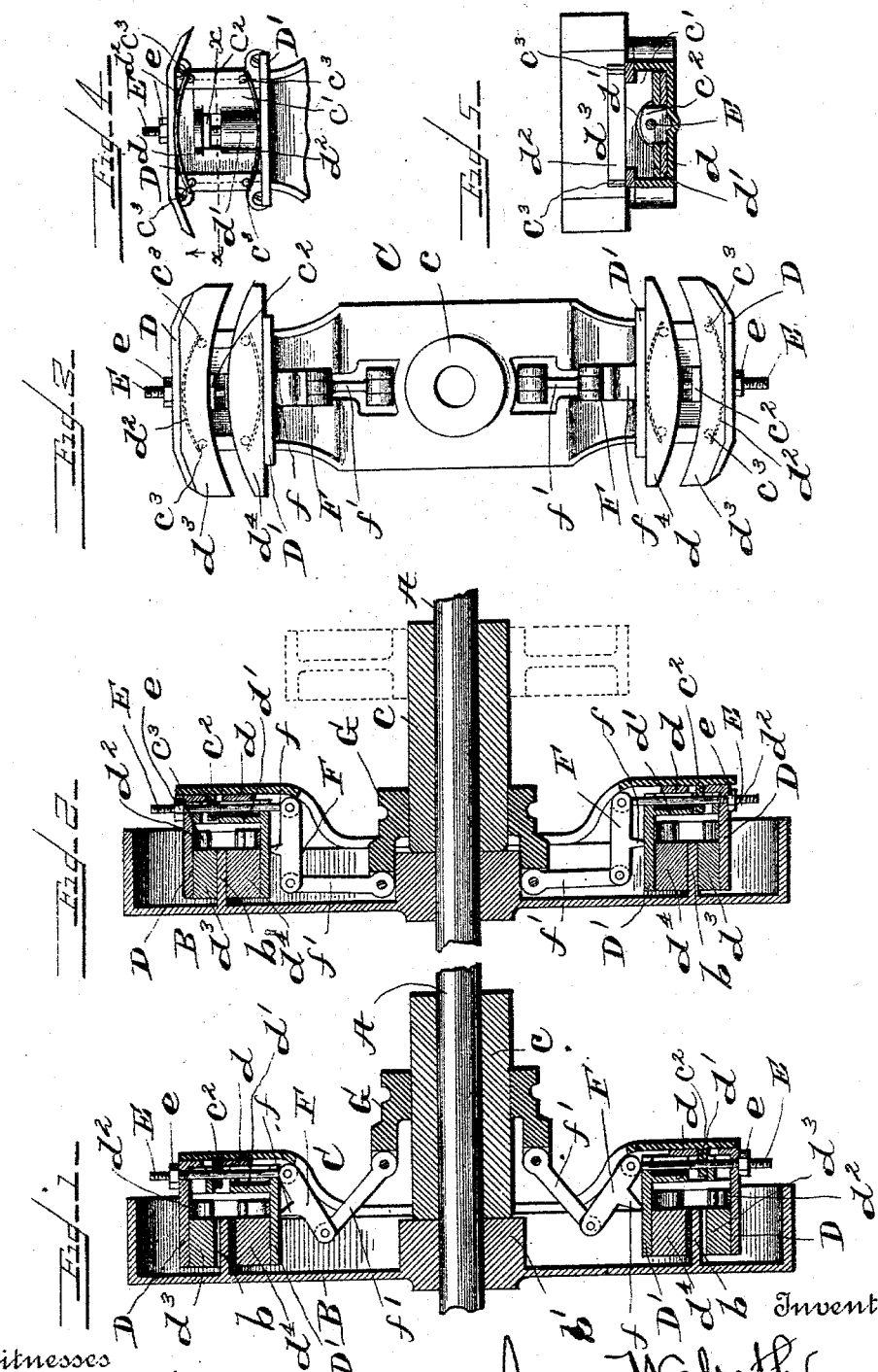

JESSE WALRATH, OF RACINE, WISCONSIN.

FRICTION-CLUTCH.

SPECIFICATION forming part of Letters Patent No. 490,002, dated January 17, 1893.

Application filed October 1, 1892. Serial No. 447,552. (No model.)

*To all whom it may concern:*

Be it known that I, JESSE WALRATH, a citizen of the United States, residing at Racine, in the county of Racine and State of Wisconsin, have invented certain new and useful Improvements in Friction-Clutches; and I do hereby declare the following to be a full, clear, and exact description of the invention, such as will enable others skilled in the art to which it appertains to make and use the same.

My invention is an improvement in friction clutches and consists in the novel features of construction and combination of parts hereinafter fully described, reference being had to the accompanying drawings which illustrate one form in which I have contemplated embodying my invention, and said invention is fully disclosed in the following description and claims.

Referring to the said drawings Figure 1 is a central section of a driving shaft and pulley provided with my improved clutch, showing the clutch thrown out of engagement with the wheel. Fig. 2 is a similar view showing the shaft and wheel clutched together. Fig. 3 is a plan view of my improved clutch detached. Fig. 4 is a detail plan view of one end of the clutch frame. Fig. 5 represents a detail section of the clutch frame on line $x$—$x$ of Fig. 4.

In the drawings A represents a revoluble shaft and B a band wheel loosely mounted thereon. The wheel B is provided with the annular clutch engaging flange $b$ and the clutch mechanism is adapted to engage frictionally both sides of said flange.

C represents the main frame of the clutch, which is provided with a sleeve $c$ engaging and secured rigidly to the shaft A, so that the clutch revolves with said shaft. The main frame of the clutch extends over the flange $b$ of the wheel B and is provided at each end with a radially disposed way $c'$ as shown in Fig. 5. Each end of the frame C is also provided with a pair of movable clutch plates D D′ having base portions constructed to fit and slide in the way $c'$. In order to give the base of each plate a sufficient bearing I prefer to arrange the base of one plate to overlap and slide upon the base of the other as shown in Figs. 1, 2 and 5. In the drawings the base $d$ of the outer plate D is arranged to slide beneath the base $d'$ of the inner plate D′. The bottom of the way $c'$ is provided with a projecting lug $c^2$ which extends through slots in the bases $d\ d'$ of the clutch plates the said slots being of such length that the lug $c^2$ will limit the movement of each clutch plate in both directions. The clutch plates are so located as to be on opposite sides of the flange $b$ of the wheel and each plate is held normally away from said flange by a spring $d^2$ which engages said plate and suitable pins or lugs $c^3\ c^3$ secured to the main clutch frame as clearly shown in dotted lines in Fig. 3.

A rod E extends through the lower portions of the clutching plates or jaws D D′ and through the lug $c^2$, and said rod is provided at its outer end with a nut $e$, which engages a screw threaded portion of the rod. The inner end of the rod E is pivotally connected with one end of a rocking lever F having a fulcrum projection $f$ which engages the inner face of the inner clutching plate D′. The opposite end of said rocking lever is connected by a link $f'$ with a shipping collar G which is loosely mounted on the sleeve C of the clutch and is capable of longitudinal movement thereon.

The positions of the parts before the clutch is thrown into operative position are illustrated in Fig. 1. The clutch plates D and D′ are provided with friction shoes $d^3\ d^4$ which are adapted to engage the inner and outer surfaces of the flange $b$ of the wheel. The nut $e$ on the rod E is turned up and the two clutch plates drawn together until the shoes are within a very short distance of the flange. If the shipping collar is moved toward the clutch frame, the inner end of the rocking arm will be moved outwardly causing the fulcrum projection to press outwardly upon the clutch plate D and the rod E to draw inwardly on the outer plate D thus forcing the shoes of the clutch tightly upon the flange $b$, gripping it between them. As the shipping collar is forced inward the links $f'$ are brought into a radial position with respect to the shaft and parallel with the face of the wheel, so that the strain is brought directly against the collar in a straight line, thus relieving the shipping devices of all lateral strain. The shipping collar is preferably provided with a groove which is adapted to be engaged by a shipping yoke (not shown) in the usual manner.

The parts of the shipping collar G to which the links $f'$ are secured are so formed as to engage the outer surface of the hub $b'$ of the wheel B as shown in Fig. 2 when the clutch is thrown into engagement with the wheel so that the strain upon the link and collar G is transmitted to the hub $b'$ and a very solid base of resistance is thus provided. It will be observed that when the shipping collar is moved toward the clutch frame the parts lock themselves so that there is no tendency for the clutch to become disengaged from the wheel as the pressure is exerted radially of the wheel, and it will also be observed that the pressure is applied equally on each side of the clutching flange $b$ by means of the sliding clutch plates and their connections before described.

I have described the operation of the clutch as it would be if the pulley wheel ran loosely upon the shaft and the clutch were secured to revolve with the shaft, but it is obvious that it would operate as well if the wheel were made to revolve with the shaft and the shaft turned loosely in the sleeve of the clutch in which case the sleeve could be supplied with a pulley or other wheel for transmitting power when the clutch was in operative engagement with the wheel.

What I claim and desire to secure by Letters Patent is:—

1. In a clutch the combination with the movable clutch plates, of a rocking lever connected at one end with one of said plates and at the other with a clutch operating device, said lever having a fulcrum projection engaging the other plate, substantially as described.

2. In a clutch the combination with the movable clutch plates for engaging opposite sides of a clutching flange, of a rocking lever having one end connected to one of said plates, a link which when the clutch is out of operation is in a position inclined to the axis of rotation of the clutch, connected to the other end of said rocking lever, and to a shipping collar, said lever having a fulcrum projection bearing against the other clutch plate, whereby said plates will be forced into engagement with said flange when moved into a radial position, substantially as described.

3. In a clutch the combination with the main body provided with a radial way, of the sliding clutch plates having base portions engaging said way, the rocking lever having one end adjustably connected with the outer clutch plate, a shipping collar, a link which when the clutch is out of operation is in a position inclined to the axis of rotation of the clutch, connected to the other end of said rocking lever, and to said shipping collar, said lever having a fulcrum projection engaging the inner clutch plate and the retraction springs for said plates, substantially as described.

4. In a clutch the combination with the clutch frame provided with a radial way, of the sliding clutch plates having slotted base portions engaging said way, the base of one plate overlapping the base of the other, a lug projecting from said clutch frame engaging the slots of said bases, for limiting the movement of the same, a rocking lever having one end connected with one of said clutch plates, a shipping collar connected with the other end of said rocking lever, said lever being provided with a fulcrum projection engaging the other clutch plate, substantially as described.

5. The combination with a revoluble shaft and a pulley provided with a projecting hub mounted thereon, of a clutch frame provided with clutch plates adapted to clamp a clutching flange between them, and having a sleeve engaging said shaft, a shipping collar movably mounted on said sleeve and having parts for engaging the periphery of said hub, operating devices for said clutch plates and links, which when the clutch is out of operation, are in a position inclined to the axis of rotation of the clutch, connecting said operating devices with the hub engaging parts of said collar, whereby the said collar may be moved to bring said parts into engagement with the hub, and said links into radial positions with respect to said shaft, substantially as described.

In testimony whereof I affix my signature in presence of two witnesses.

JESSE WALRATH.

Witnesses:
CHARLES H. LEE,
BYRON B. BLAKE.